United States Patent
Nio et al.

(10) Patent No.: US 7,339,959 B2
(45) Date of Patent: Mar. 4, 2008

(54) SIGNAL TRANSMITTER AND SIGNAL RECEIVER

(75) Inventors: Yutaka Nio, Osaka (JP); Hidekazu Suzuki, Yamatokoriyama (JP); Toshiro Nishio, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1034 days.

(21) Appl. No.: 10/149,309

(22) PCT Filed: Oct. 12, 2001

(86) PCT No.: PCT/JP01/09001

§ 371 (c)(1),
(2), (4) Date: Oct. 8, 2002

(87) PCT Pub. No.: WO02/32133

PCT Pub. Date: Apr. 18, 2002

(65) Prior Publication Data

US 2003/0112828 A1    Jun. 19, 2003

(30) Foreign Application Priority Data

Oct. 12, 2000    (JP) ............................. 2000-311585

(51) Int. Cl.
*H04J 3/04* (2006.01)
(52) U.S. Cl. ...................... 370/535; 370/486; 370/493; 725/143
(58) Field of Classification Search ................ 370/521, 370/486–490, 493, 535–538; 382/232, 251; 455/39; 725/140, 143; 715/500.1
See application file for complete search history.

(56) References Cited

U.S. PATENT DOCUMENTS

| 4,851,909 A | 7/1989 | Noske et al. |
| 5,506,627 A | 4/1996 | Ciardi et al. |
| 5,701,581 A * | 12/1997 | Eto et al. ................. 348/14.13 |

(Continued)

FOREIGN PATENT DOCUMENTS

JP    60-174958    11/1985

(Continued)

OTHER PUBLICATIONS

Detailed Description of the SCSI Standard- Separate-volume Interface-The latest SCSI Manual, Feb. 1, 1989, pp. 144-147.

(Continued)

*Primary Examiner*—John Pezzlo
(74) *Attorney, Agent, or Firm*—Marjama Muldoon Blasiak & Sullivan LLP

(57) ABSTRACT

A signal transmitter and a signal receiver comprises a time base compression part (101) for compressing an audio signal on a time base to output the compressed signal as a time base compressed audio signal and a multiplexing part (102) for multiplexing a video signal, a control signal, and the time base compressed audio signal to output the multiplexed signal to the external as a video/audio control multiplexed signal. The thus constituted signal transmitter and the signal receiver realize a signal transmission system for multiplexing and transmitting the video signal, audio signal, and control signal, for consequently transmitting high-quality diverse digital audio signals without conversion into an analog signal, and for transmission at high speed with minimal error.

20 Claims, 14 Drawing Sheets

U.S. PATENT DOCUMENTS

| | | | |
|---|---|---|---|
| 5,726,682 A * | 3/1998 | Lum et al. | 345/604 |
| 5,940,070 A | 8/1999 | Koo et al. | |
| 6,337,867 B1 * | 1/2002 | Ejiri | 370/537 |
| 6,404,928 B1 * | 6/2002 | Shaw et al. | 382/232 |
| 7,243,131 B1 * | 7/2007 | Inoue | 709/208 |
| 2003/0032392 A1 | 2/2003 | Suzuki | 455/39 |

FOREIGN PATENT DOCUMENTS

| | | |
|---|---|---|
| JP | 04302594 A | 10/1992 |
| JP | 5-64171 | 3/1993 |
| JP | 06133239 A | 5/1994 |
| JP | 06343165 A | 12/1994 |
| JP | 08130671 A | 5/1996 |
| JP | 09179536 A | 7/1997 |
| JP | WO98/15121 | 4/1998 |
| JP | 2000228762 A | 6/2000 |
| JP | 2000188757 A | 7/2000 |
| JP | 2000228762 A | 8/2000 |
| JP | 2001-251385 | 9/2001 |
| JP | 2001-290319 | 6/2002 |
| JP | 2002-171495 | 6/2002 |
| JP | 2000175203 A | 6/2003 |
| WO | 97/48056 | 12/1997 |
| WO | 00/14626 | 3/2000 |
| WO | WO 02/09443 A1 | 1/2002 |

OTHER PUBLICATIONS

Outline of the DPMS&DDC Standard, Interface, Oct. 1, 1995, pp. 144-148.

Silicon Image, PanelLink A/V: The Digital Solution for HDTV, Feb. 2001.

DDWG (Digital Display Working Group), "Digital Visual Interface DVI", Revision 1.0, Apr. 2, 1999.

Yoshida J: "Silicon Image chips add audio support to DVI link", EE Times, Jan. 18, 2001.

Reynolds, Keith Y. and Rainbolt , Joe: "Multiplexing and Demultiplexing Digital Audio and Video in Today's Digital Environment," SMPTE Journal, Oct. 1993, pp. 905-909.

U.S. Patent and Trademark Office Office Action Dated May 3, 2007, U.S. Appl. No. 10/130,694, filing date of Aug. 13, 2002, 10 pages.

* cited by examiner

SIGNAL TRANSMITTER AND SIGNAL RECEIVER

TECHNICAL FIELD

The present invention relates to a signal transmission apparatus and a signal reception apparatus for transmitting digital baseband signals.

BACKGROUND ART

A signal transmission system based on the DVI (Digital Visual Interface) standard, which is one of conventional digital signal transmission methods, will be described with reference to FIG. 25. FIG. 25 is a diagram illustrating the construction for realizing a serial transfer system referred to as TMDS (Transition Minimized Differential Signaling), which is one of the conventional transmission systems.

In the drawing, numerals 2601~2603 denote TMDS encoders/serializers which are provided in a signal transmission apparatus. The TMDS encoders/serializers 2601~2603 perform TMDS encoding on inputted component signals such as RED, GREEN, and BLUE, serialize the encoded component signals, and output the serialized component signals to a transmission path. Numerals 2604~2606 denote TMDS decoders/recovery units which are provided in a signal reception apparatus. The TMDS decoders/recovery units 2604~2606 perform TMDS decoding on the received signals and recover the decoded signals, thereby reconstructing the component signals. A DE (Data Enable) signal indicates a period during which a component signal such as RED, GREEN, or BLUE exists, and this is a HIGH active signal. For example, a period during which the DE signal is LOW is a horizontal sync signal period or vertical sync signal period of video. CTL (control) signals, CTL0, CTL1, CTL2, and CTL3, are prepared as control signals. However, in the current DVI standard, the CTL signals CTL1, CTL2, and CTL3 are not used yet. To be specific, the levels of the control signals are "0" at all time.

The conventional signal transmission system so constructed will be described.

In each of the TMDS encoders/serializers 2601~2603 in the signal transmission apparatus, a video signal (RGB signal) inputted at 8 bits is converted into a 10-bit video signal, and it is serialized to be outputted to the transmission path. The 8-bits/10-bits conversion aims to reduce the number of change points of data so as to convert the video signal into a form suited for high-speed transmission. Further, in the TMDS encoders/serializers 2601~2603, a 2-bit CTL signal is converted into a 10-bit CTL signal to be outputted to the transmission path. Further, the DE signal is also encoded, serialized, and outputted to the transmission path.

In each of the TMDS decoders/recovery units 2604~2606 in the signal reception apparatus, the 10-bit serial data received through the transmission path is decoded and recovered to the 8-bit chrominance signal, the DE signal, and the 2-bit CTL signal.

However, the DVI standard is a standard for transmitting only video signals (RGB signals), and therefore, the conventional signal transmission system based on the DVI standard cannot transmit an audio signal and a control signal for controlling a monitor. The signal for controlling the monitor is a control signal to realize a processing in a device to be connected, utilizing features of the signal. Hereinafter, the signal for controlling the monitor is referred to simply as a control signal.

That is, conventionally, an audio signal is transmitted through a different line and, thus, cable connection between the signal transmission apparatus and the signal reception apparatus is extremely complicated for a user. Further, the audio signal is not under copy protection. Furthermore, the control signal cannot be transmitted in the current analog connection and can be transmitted only as an auxiliary signal of video in a vertical blanking period (VBK), and since the control signal has a narrow band, advanced processing cannot be carried out, resulting in frequent errors.

The present invention is made to solve the above-described problems and has for its object to provide a signal transmission apparatus and a signal reception apparatus, which realize a signal transmission system that is applied to the DVI standard, and capable of transmitting an audio signal and a control signal for controlling a monitor, together with a video signal.

DISCLOSURE OF THE INVENTION

According to the present invention, there is provided a signal transmission apparatus comprising: a time-base compression unit for compressing an audio signal on the time axis to output a time-base-compressed audio signal; and a multiplexing unit for multiplexing a video signal, a control signal, and the time-base-compressed audio signal to output a multiplexed video-audio-control signal to the outside.

Therefore, a multiplexed video-audio-control signal is transmitted, whereby a large variety of high-quality digital audio signals can be transmitted without being converted into analog signals, and high-speed transmission with fewer errors can be performed.

According to the present invention, in the signal transmission apparatus, the multiplexing unit comprises: a first horizontal line counter for counting the number of horizontal lines on a screen; a first selector for selecting either the control signal or the time-base-compressed audio signal to output; a first multiplexing controller for controlling the first selector; a second selector for selecting either the output signal from the first selector or the video signal to output; and a second multiplexing controller for controlling the second selector. second selector.

Therefore, multiplexing of the video signal, the time-base-compressed audio signal, and the control signal can be easily performed.

According to the present invention, in the signal transmission apparatus, the multiplexing unit comprises: a first horizontal line counter for counting the number of horizontal lines on a screen; a first selector for selecting either the control signal or the time-base-compressed audio signal to output; a first multiplexing controller for controlling the first selector; a second selector for selecting either the output signal from the first selector or the video signal to output; and a second multiplexing controller for controlling the second selector.

Therefore, a multiplexed video-audio-control signal is transmitted, whereby a large variety of high-quality digital audio signals can be transmitted without being converted into analog signals, and high-speed transmission with fewer errors can be performed.

According to the present invention, the signal transmission apparatus comprising: a time-base compression unit for compressing an audio signal on the time axis to output a time-base-compressed audio signal; a decomposition unit for decomposing the time-base-compressed audio signal to superimpose on a first control signal, a second control signal, and a third control signal; and a control signal superimposing means for superimposing the control signal on the first control signal.

Therefore, it is possible to realize a signal transmission system applied to the DVI standard, in which the time-base-compressed audio signal and the control signal are superimposed on the video signal.

According to the present invention, in the signal transmission apparatus, the control signal is constituted by a section in which the contents of the control signal are prescribed by whole makers, and a section of a maker-original control signal.

Therefore, it is possible to realize a signal transmission system which can perform a display with high picture quality when the same maker's apparatuses are connected.

According to the present invention, in the signal transmission apparatus, the control signal is constituted by a section in which the contents of the control signal are prescribed by whole makers, an apparatus discrimination control section for discriminating an apparatus, and a section of a maker-original control signal.

Therefore, it is possible to realize a signal transmission system which can specify an apparatus to transmit a signal, and perform a display with high picture quality when the same maker's apparatuses are connected.

According to the present invention, in the signal transmission apparatus, the control signal includes information for discriminating a sequence of cinema.

Therefore, it is possible to realize a signal transmission system in which a special sequence such as a signal of 24P or 30P can be transmitted to a signal reception apparatus, and monitor display can be performed with high picture quality at the receiving end.

According to the present invention, in the signal transmission apparatus, the control signal includes information indicating compressibility of video.

Therefore, it is possible to realize a signal transmission system which can perform a display with optimum picture quality.

According to the present invention, in the signal transmission apparatus, the control signal includes frame information of video.

Therefore, it is possible to realize a signal transmission system which can perform a display with optimum picture quality.

According to the present invention, in the signal transmission apparatus, the control signal includes information for discriminating whether video is on a data broadcasting screen or on a usual motion picture screen.

Therefore, it is possible to realize a signal transmission system which can perform a display with optimum picture quality.

According to the present invention, in the signal transmission apparatus, the control signal includes information indicating the position of block noise of video.

Therefore, it is possible to realize a signal transmission system in which noise information of a video signal can be transmitted to a reception apparatus, thereby removing noise at display.

According to the present invention, there is provided a signal reception apparatus for receiving a video-audio-control signal in which a video signal, a time-base-compressed audio signal, and a control signal are multiplexed, comprising: a demultiplexing unit for demultiplexing the video-audio-control signal into the video signal, the time-base-compressed audio signal, and the control signal; a time-base decompression unit for performing time-base decompression on the time-base-compressed audio signal to reconstruct an original audio signal; and an audio clock reproduction unit for receiving a video clock from the signal apparatus, and reproducing an audio clock on the basis of the video clock to output to the time-base decompression unit.

Therefore, it is possible to realize a signal transmission system which can transmit a multiplexed video-audio-control signal, thereby transmitting a large variety of high-quality digital audio signals without converting them into analog signals, and performing high-speed transmission with fewer errors.

According to the present invention, in the signal reception apparatus, the demultiplexing unit comprises: a second horizontal line counter for counting the number of horizontal lines on a screen; a third selector for demultiplexing the multiplexed video-audio-control signal into the video signal and the multiplexed audio-control signal; a first demultiplexing controller for controlling the third selector; a fourth selector for demultiplexing the multiplexed audio-control signal into the control signal and the time-base-compressed audio signal; and a second demultiplexing controller for controlling the fourth selector.

Therefore, the multiplexed video-audio-control signal can be easily demultiplexed into the video signal, the time-base-compressed audio signal, and the control signal.

According to the present invention, there is provided a signal reception apparatus for receiving RGB video signals as serial data, in which a control signal for controlling a monitor or the like which is to be connected, that is multiplexed into a blanking section of a video signal in either one or all of the signal lines RED, GREEN, and BLUE, is extracted.

Therefore, it is possible to realize a signal transmission system which can transmit a multiplexed video-audio-control signal, thereby transmitting a large variety of high-quality digital audio signals without converting them into analog signals, and performing high-speed transmission with fewer errors.

According to the present invention, the signal reception apparatus comprising: a control signal demultiplexing means for extracting a multiplexed audio-control signal from a first control signal, and demultiplexing the multiplexed audio-control signal into a time-base-compressed audio signal and a control signal; a composition unit for composing time-base-compressed audio signals extracted from a second and third control signals, and the time-base-compressed audio signal demultiplexed by the control signal demultiplexing means; and a time-base decompression unit for performing time-base decompression on the composite time-base-compressed audio signal to reconstruct an original audio signal.

Therefore, it is possible to realize a signal transmission system applied to the DVI standard, which can demultiplexe the multiplexed video-audio-control signal into the video signal, the time-base-compressed audio signal, and the control signal, and reconstruct the audio signal from the time-base-compressed audio signal.

According to the present invention, in the signal reception apparatus, the control signal is constituted by a section in which the contents of the control signal are prescribed by whole makers, and a section of a maker-original control signal.

Therefore, it is possible to realize a signal transmission system which can perform a display with high picture quality when the same maker's apparatuses are connected.

According to the present invention, in the signal reception apparatus, the control signal is constituted by a section in which the contents of the control signal are prescribed by whole makers, an apparatus discrimination control section for discriminating an apparatus, and a section of a maker-original control signal.

Therefore, it is possible to realize a signal transmission system which can specify an apparatus to transmit a signal, and perform a display with high picture quality when the same maker's apparatuses are connected.

According to claim 18 of the present invention, in the signal reception apparatus, the control signal includes information for discriminating a sequence of cinema.

Therefore, it is possible to receive a special sequence such as a signal of 24P or 30P, and perform a monitor display with high picture quality.

According to the present invention, in the signal reception apparatus, the control signal includes information indicating compressibility of video.

Therefore, it is possible to realize a signal transmission system which can perform a display with optimum picture quality.

According to the present invention, in the signal reception apparatus, the control signal includes information indicating compressibility of video.

Therefore, it is possible to realize a signal transmission system which can perform a display with optimum picture quality.

According to the present invention, in the signal reception apparatus, the control signal includes information for discriminating whether video is on a data broadcasting screen or on a usual motion picture screen.

Therefore, it is possible to realize a signal transmission system which can perform a display with optimum picture quality.

According to the present invention, in the signal reception apparatus, the control signal includes information indicating the position of block noise of video.

Therefore, it is possible to realize a signal transmission system which can receive noise information of a video signal, thereby removing noise at display.

BEST MODE TO EXECUTE THE INVENTION

Hereinafter, embodiments according to the present invention will be described with reference to the drawings. The embodiments described here are given only as examples and the present invention is not restricted to these embodiments.

Embodiment 1

Figure 1:
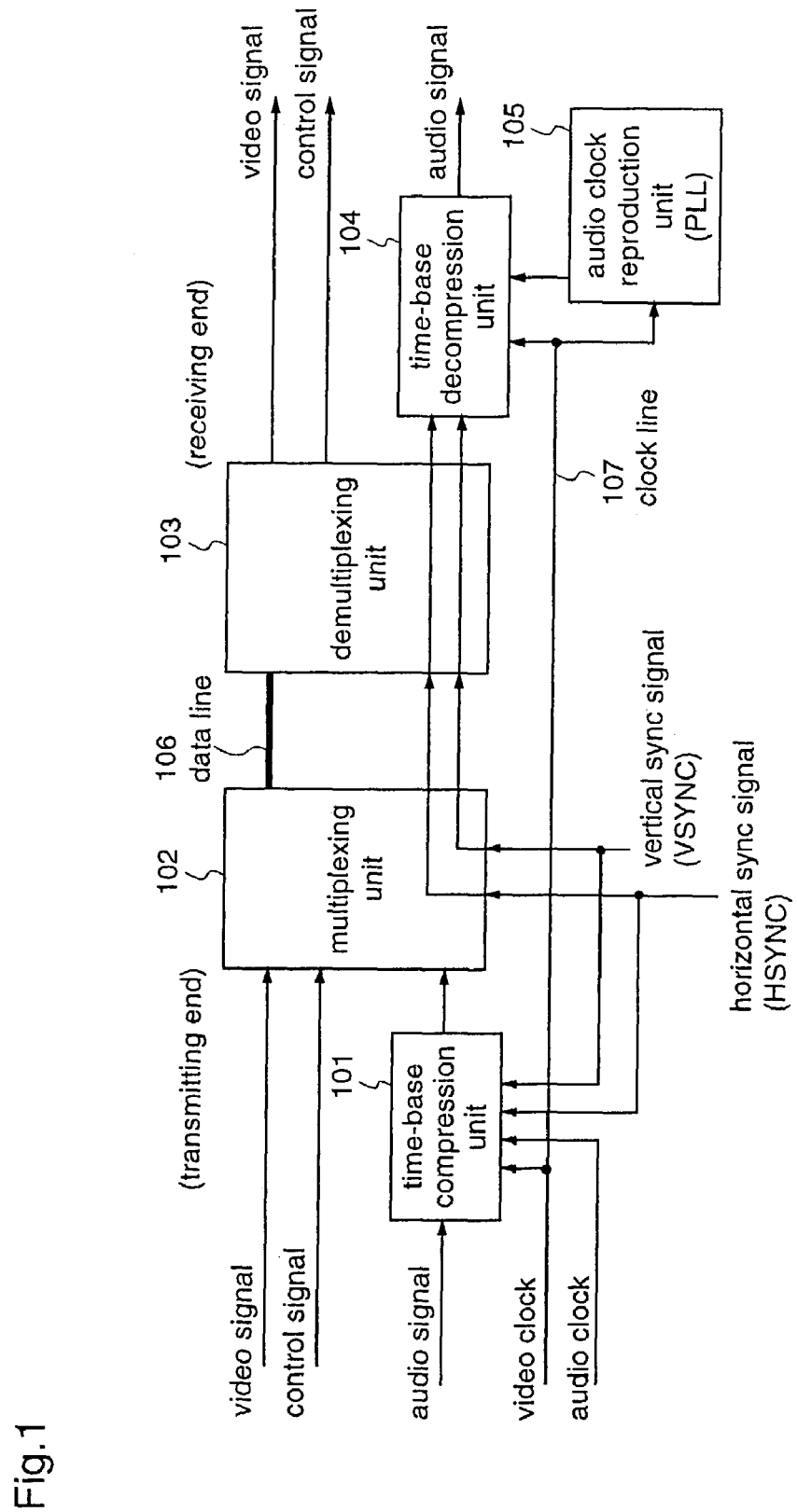
FIG. 1 is a diagram illustrating the construction of a signal transmission system according to a first embodiment.

FIG. 1 is a diagram illustrating the construction of a signal transmission system according to a first embodiment.

Figure 4:
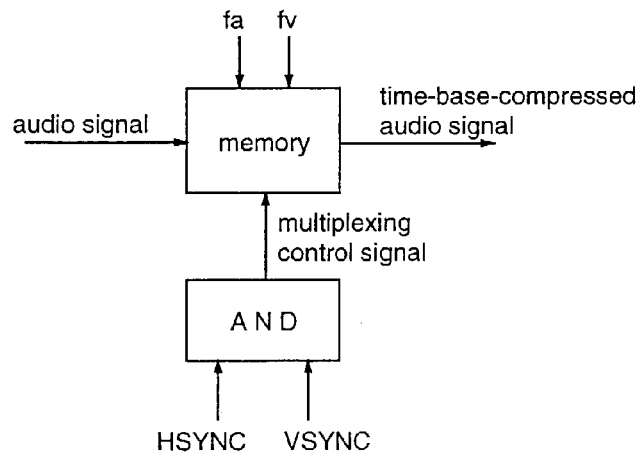
FIG. 4 is a diagram illustrating the construction of a time-base compression unit in the signal transmission system according to the first embodiment.

With reference to FIG. 1, numeral 101 denotes a time-base compression unit for compressing an audio signal on the time axis. The internal construction of the time-base compression unit 101 is shown in FIG. 4. In FIG. 4, the time-base compression unit 101 is constituted mainly by a memory, and converts the rate of the inputted audio signal. To be specific, a sampling clock for input is an audio clock "fa", and a sampling clock for output is a video clock "fv".

Here, "fa" is an audio sampling clock frequency, and "fv" is a video sampling clock frequency. A multiplexing control signal is used for controlling the output of the [time compression unit] time base compression unit 101. This multiplexing control signal is the AND of a horizontal sync signal and a vertical sync signal. The horizontal sync signal and the vertical sync signal are negative logic.

Figure 6:
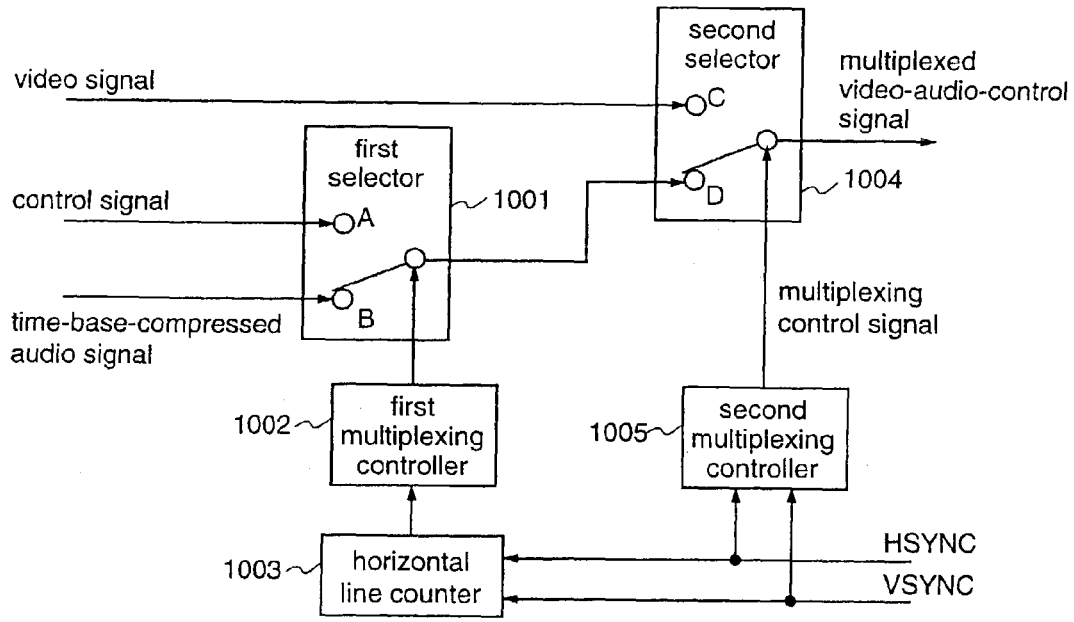
FIG. 6 is a diagram illustrating the construction of a multiplexing unit in the signal transmission system according to the first embodiment.

Numeral 102 denotes a multiplexing unit 102 for multiplexing a video signal, the time-base-compressed audio signal, and a signal for controlling a monitor (hereinafter, referred to as a "control signal"), and outputting the multiplexed signal to an after-mentioned data line 106. The internal construction of the multiplexing unit 102 is shown in FIG. 6. In FIG. 6, numeral 1001 denotes a first selector for selecting either the control signal or the time-base-compressed audio signal. Numeral 1002 denotes a first multiplexing controller for controlling the first selector 1001. Numeral 1003 denotes a horizontal line counter for counting the number of horizontal lines on a screen. Numeral 1004 denotes a second selector for selecting either the video signal or the output from the first selector 1001. Numeral 1005 denotes a second multiplexing controller for controlling the second selector 1004.

Figure 8:
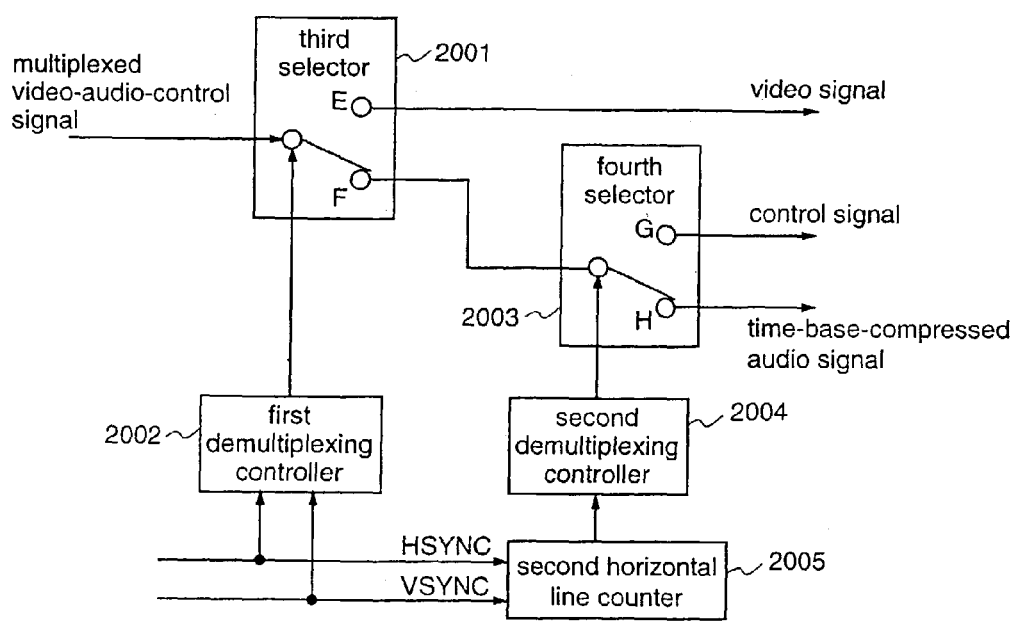
FIG. 8 is a diagram illustrating the construction of a demultiplexing unit in the signal transmission system according to the first embodiment.

Numeral 103 denotes a demultiplexing unit for demultiplexing a multiplexed video-audio-control signal which is transmitted through the data line 106. The internal construction of the demultiplexing unit 103 is shown in FIG. 8. In FIG. 8, numeral 2001 denotes a third selector for dividing the multiplexed video-audio-control signal into the video signal and the other signals. Numeral 2002 denotes a first demultiplexing controller for controlling the third selector 2001. Numeral 2003 denotes a fourth selector for dividing the multiplexed audio-control signal in which the time-base-compressed audio signal and the control signal are multiplexed, into the time-base-compressed audio signal and the control signal. Numeral 2004 denotes a second demultiplexing controller for controlling the fourth selector 2003. Numeral 2005 denotes a second horizontal line counter for counting the number of horizontal lines on the screen on the signal reception apparatus side.

Figure 10:
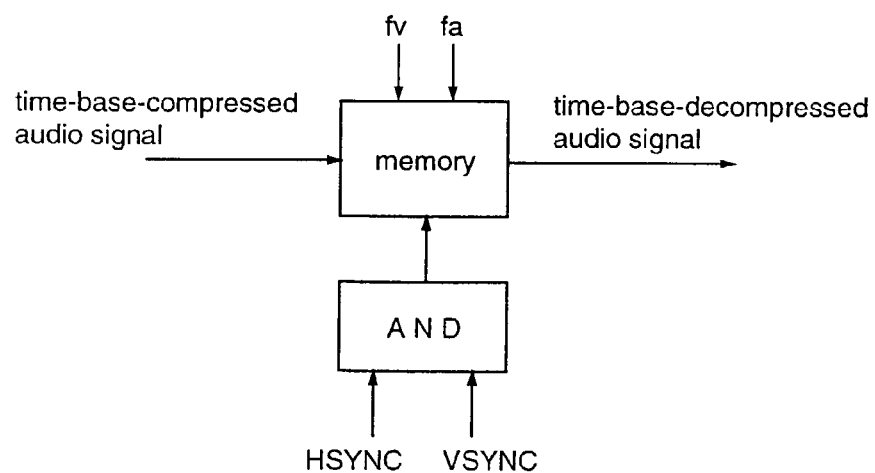
FIG. 10 is a diagram illustrating the construction of a time-base decompression unit in the signal transmission system according to the first embodiment.

Numeral 104 denotes a time-base decompression unit for performing time-base decompression on the time-base-compressed audio signal separated by the demultiplexing unit 103 to reconstruct the original audio signal. The internal construction of the time-base decompression unit 104 is shown in FIG. 10. In FIG. 10, the time-base decompression unit 104 is constituted mainly by a memory, and receives the time-base-compressed audio signal at the video sampling clock frequency fv in a period during which a decompression control signal is LOW, and outputs the audio signal after time-base decompression at the audio sampling clock frequency fa. The decompression control signal is the AND of the horizontal sync signal (HSYNC) and the vertical sync signal (VSYNC). However, both of the horizontal sync signal and the vertical sync signal are negative logic (Active Low).

Numeral 105 denotes an audio clock reproduction unit for reproducing an audio clock on the basis of a video clock which is outputted from the signal transmission apparatus. Numeral 106 denotes a data line, which is a serial transmission path connecting the signal transmission apparatus and the signal reception apparatus. Numeral 107 denotes a clock line for transmitting the video clock from the signal transmission apparatus to the signal reception apparatus.

Figure 2:
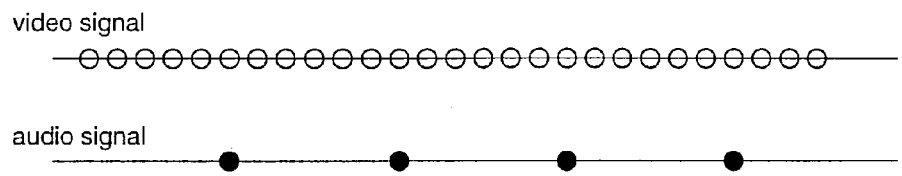
FIG. 2 is a diagram illustrating the relationship between a video signal and an audio signal before time-base compression.
Figure 3:
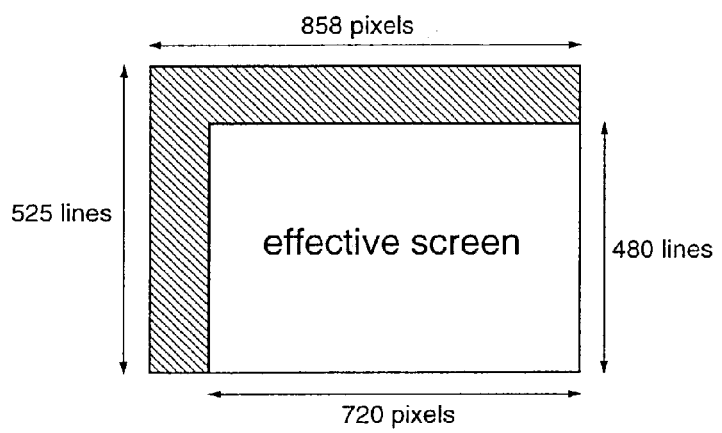
FIG. 3 is a diagram for explaining a horizontal synchronization period, a vertical synchronization period, and an effective screen.

The relationship between the video signal and the audio signal before being subjected to time-base compression is schematically shown in FIG. 2. Generally, the amount of data per unit time is larger in the video signal than in the audio signal. Therefore, one sample of the audio signal approximately corresponds to several samples of the video signal. Here, the temporally compressed audio signal and the control signal for controlling a monitor are multiplexed into a domain where no video signal exists. As a control signal for controlling the monitor, there is for example a signal for controlling the brightness or the volume. To be specific, as a time period where no video signal exists, there is for example a horizontal synchronization period or vertical synchronization period of the video signal as shown in FIG. 3. In FIG. 3, a diagonally shaded portion outside an effective screen corresponds to a synchronization period. In FIG. 3, the hatched portion outside the effective screen corresponds to the synchronization period. In FIG. 3, a SD screen of MP@ML (Main Profile Main Level) of MPEG2 is employed as an example. The full screen comprises 858 pixels in the horizontal direction×525 lines in the vertical direction. The effective screen comprises 720 pixels in the horizontal direction×480 lines in the vertical direction. A difference between the full screen and the effective screen corresponds to the synchronization period. The audio signal and the monitor control signal are multiplexed into this synchronization period.

Hereinafter, the operation of the signal transmission system according to the first embodiment will be described.

Initially, the operation of the signal transmission apparatus will be described.

Figure 5:
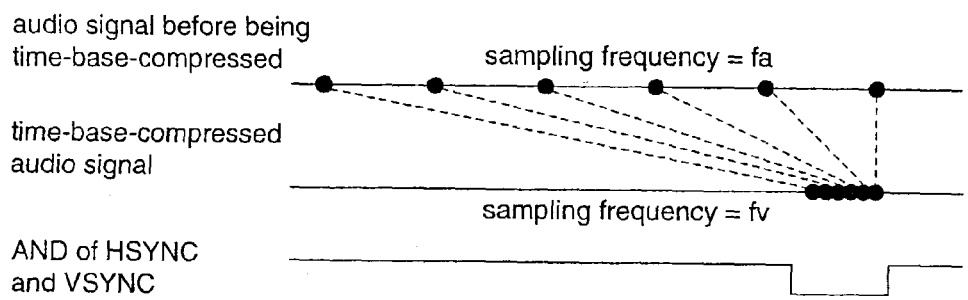
FIG. 5 is a diagram for explaining time-base compression in the signal transmission system according to the first embodiment.

As shown in FIG. 5, the audio signal is inputted to the time-base compression unit 101 at the sampling frequency fa, and the audio signal after time-base compression is outputted at the sampling frequency fv, thereby outputting the time-base-compressed audio signal to the multiplexing unit 102. The time-base-compressed audio signal is outputted in a period during which the multiplexing control signal is LOW. Although, in FIG. 5, several audio sampling points, which are outputted in the period during which the multiplexing control signal is LOW, are shown for the sake of simplification, the number of audio sampling points to be outputted actually is far larger than that shown in FIG. 5.

Figure 7:
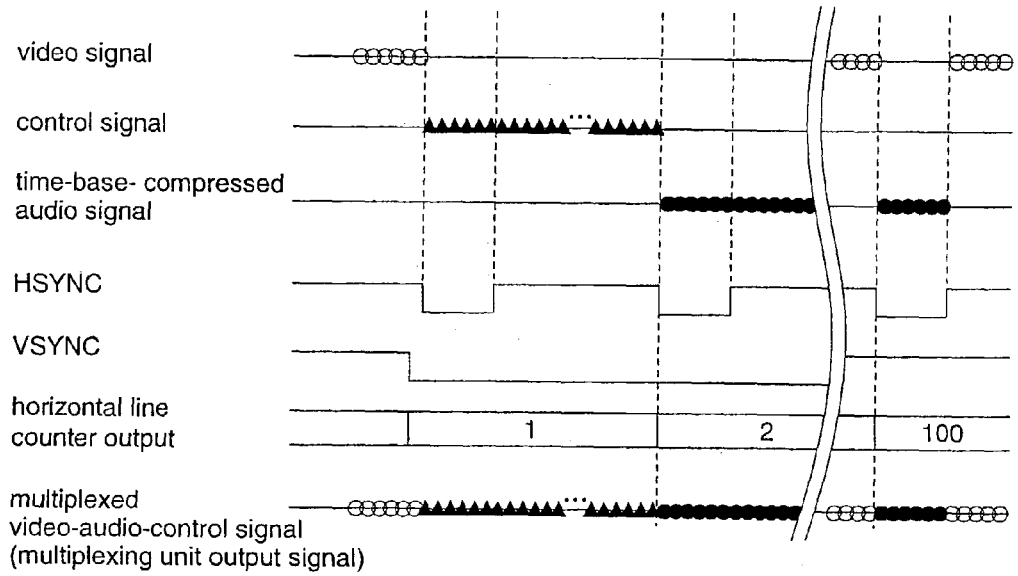
FIG. 7 is a diagram illustrating multiplexing of a video signal, an audio signal, and a control signal in the signal transmission system according to the first embodiment.

Then, as shown in FIG. 7, the time-base-compressed audio signal and the control signal are multiplexed into a period where no video signal exists by the multiplexing unit 102, and the multiplexed signal is outputted to the data line 106 as a [multiplexed video-audio signal] multiplexed video-audio-control signal. In FIG. 7, white circles show sampling points of the video signal, triangles show sampling points of the control signal, and black circles show sampling points of the audio signal.

The operation of the multiplexing unit 102 will be described more specifically with reference to FIG. 6. The horizontal line counter 1003 performs count-up at every falling edge of the horizontal sync signal (HSYNC) with a falling edge of the vertical sync signal (VSYNC) being a starting point, thereby counting the number of horizontal lines. The initial value of the horizontal line counter 1003 is "1".

When the output of the horizontal line counter 1003 is "1", the control signal side (A) of the first selector 1001 is selected by the first multiplexing controller 1002, and the control signal is outputted to the second selector 1004.

When the output of the horizontal line counter 1003 is equal to or larger than 2, the audio signal side (B) of the first selector 1001 is selected by the first multiplexing controller 1002, and the time-base-compressed audio signal is outputted to the second selector 1004. In the vertical synchronization period (a period during which the VSYNC is LOW)

or the horizontal synchronization period (a period during which the HSYNC is LOW), the control signal/[audio signal] time base-compressed audio signal selected output side (D) of the second selector 1004 is selected by the second multiplexing controller 1005. In a period that is neither the vertical synchronization period nor the horizontal synchronization period, i.e., an effective screen period, the video signal side (c) of the second selector 1004 is selected by the second multiplexing controller 1005. As shown in FIG. 3, a monitor control signal is superimposed on the 1st line while an [audio signal] time-base-compressed audio signal is superimposed on the 2nd to 45th lines and, further, the [audio signal] time-base-compressed audio signal is also superimposed on the horizontal synchronization period corresponding to the 46th and subsequent lines, to be outputted to the data line 106.

In this way, the control signal is superimposed on the 1st line in the vertical synchronization period, the audio signal is superimposed on the 2nd and subsequent lines in the vertical synchronization period, the video signal is superimposed on the effective screen period, and the audio signal is superimposed on the horizontal synchronization period. Thereby, a multiplexed video-audio-control signal, in which the video signal, the time-base-compressed audio signal, and the control signal are multiplexed, can be obtained.

Next, the operation of the signal reception apparatus will be described.

Figure 9:
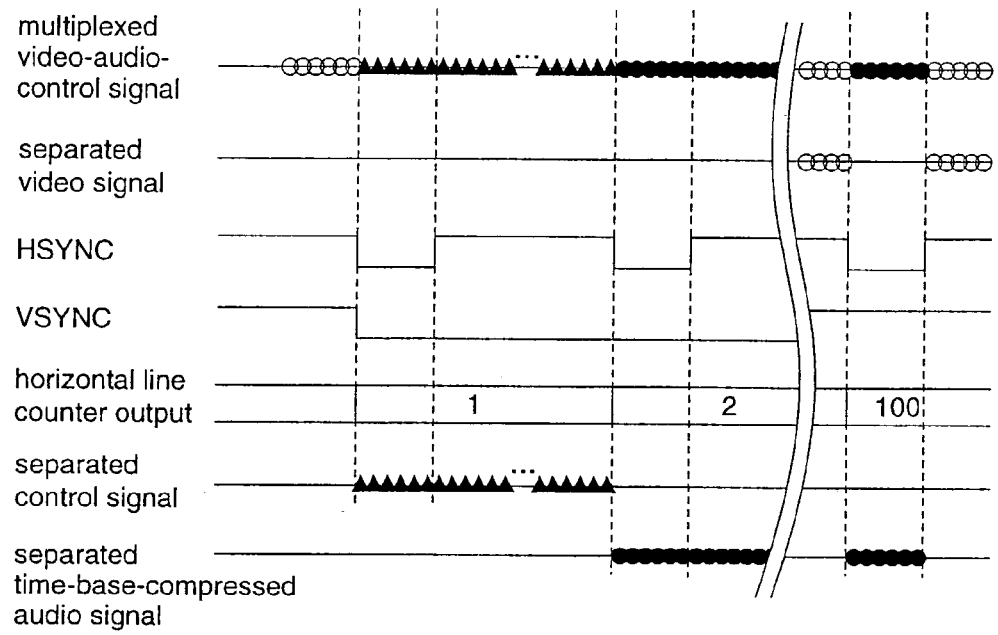
FIG. 9 is a diagram illustrating demultiplexing of a video signal, an audio signal, and a control signal in the signal transmission system according to the first embodiment.

The multiplexed video-audio-control signal which is transmitted from the signal transmission apparatus through the data line 106 is separated into the video signal, the control signal, and the time-base-compressed audio signal by the demultiplexing unit 103, as shown in FIG. 9.

The operation of the demultiplexing unit 103 will be described in more detail with reference to FIG. 8. It is regarded that the video signal is superimposed on the period other than the horizontal synchronization period and the vertical synchronization period, and the third selector 2001 is connected at the E side by the first demultiplexing controller 2002, thereby demultiplexing the video signal. Further, it is regarded that the control signal or the [audio signal] time-based-compressed audio signal is superimposed on the vertical synchronization period or the horizontal synchronization period, and the third selector 2001 is connected at the F side by the first demultiplexing controller 2002, thereby demultiplexing the signal other than the video signal, i.e., the multiplexed audio-control signal to output to the fourth selector 2003. As the control signal is superimposed on the 1st line in the vertical synchronization period on the screen, when the second horizontal line counter 2005 counts the 1st line, the fourth selector 2003 is connected at the G side by the second demultiplexing controller 2004, thereby demultiplexing the control signal. As the [audio signal] time-base-compressed audio signal is superimposed on the 2nd to 45th lines (before the start of the effective screen) in the vertical synchronization period on the screen, when the second horizontal line counter 2005 counts the 2nd to 45th lines, the fourth selector 2003 is connected at the H side by the second demultiplexing controller 2004, thereby demultiplexing the time-base-compressed audio signal to output to the time-base decompression unit 104.

Figure 11:
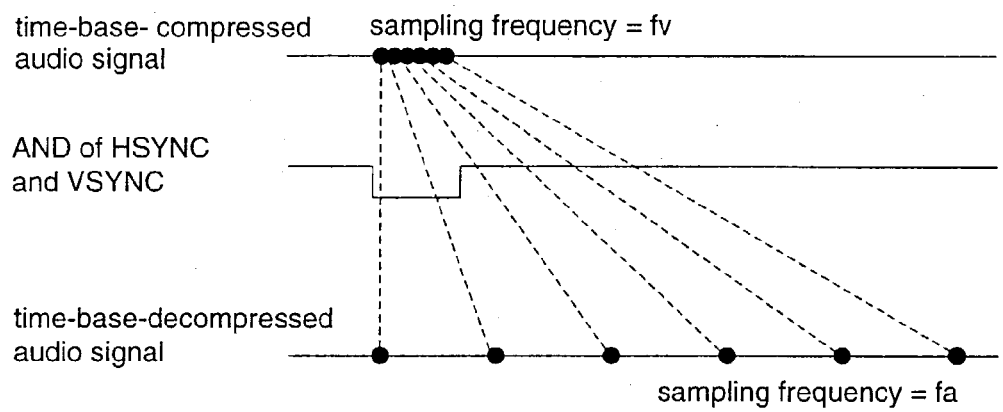
FIG. 11 is a diagram for explaining time-base decompression in the signal transmission system according to the first embodiment.

As shown in FIG. 11, data in a period during which the decompression control signal is LOW is regarded as an audio signal, and the time-base-compressed audio signal is inputted at the sampling frequency fv in the period during which the decompression control signal is LOW, and the audio signal after time-base decompression is outputted at the sampling frequency fa, thereby obtaining the time-base-decompressed audio signal.

Then, the video clock supplied from the signal transmission apparatus is inputted to a PLL (Phase Locked Loop) in the audio clock reproduction unit 105, whereby the audio clock is reproduced, and the audio clock is supplied to the time-base decompression unit 104 to reproduce the audio signal.

As described above, in the signal transmission system according to the first embodiment of the present invention, the multiplexing unit multiplexes the control signal in the 1st line in the vertical synchronization period where no video signal exists, and multiplexes the time-base-compressed audio signal in the 2nd and subsequent lines in the vertical synchronization period where no video signal exists, and in the horizontal synchronization period, whereby the video signal, the audio signal, and the control signal can be transmitted through the same data line 106.

At the receiver, the video signal is separated and extracted from the multiplexed video-audio-control signal which is transmitted through the data line 106, by employing the horizontal sync signal and the vertical sync signal, and the audio signal and the control signal are separated and extracted by counting the number of horizontal lines in the vertical synchronization period, whereby the video signal, the audio signal, and the control signal can be separated.

Further, the audio signal is time-base compressed in the signal transmission apparatus, and the time-base-compressed audio signal is time-base decompressed in the signal reception apparatus, whereby the audio signal can be multiplexed into a space between the video signals and demultiplexed therefrom.

While in the first embodiment data in the period during which the decompression control signal is LOW is the audio signal, this is not to be regarded as restrictive according to circuit configuration.

Embodiment 2

Hereinafter, a signal transmission system according to a second embodiment will be described with reference to the FIGS. 14 to 17. According to this second embodiment, the signal transmission system according to the first embodiment is applied to the DVI (Digital Visual Interface) standard.

Figure 14:
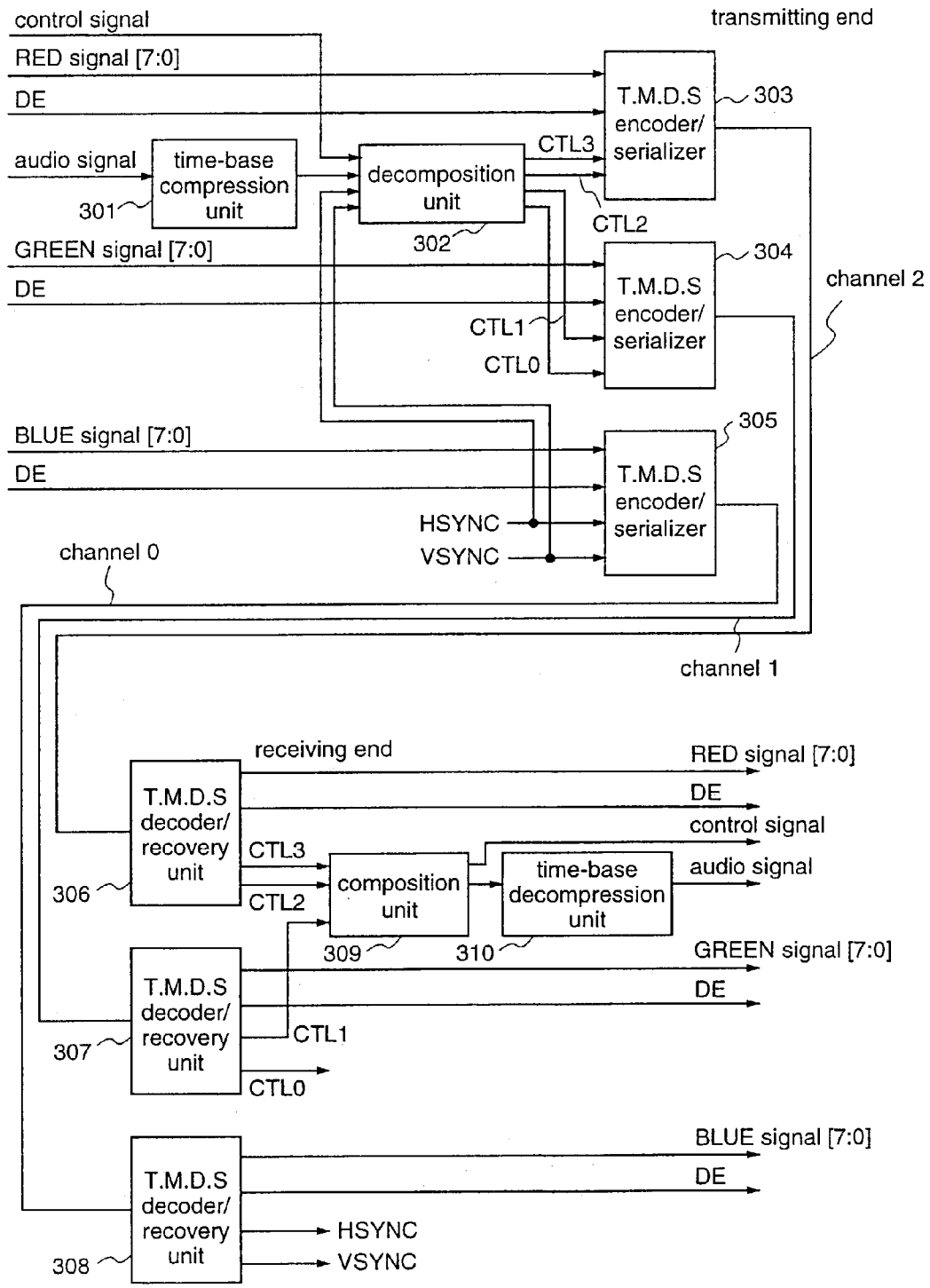
FIG. 14 is a diagram illustrating the construction of a signal transmission system according to a second embodiment.

FIG. 14 is a diagram illustrating the construction of the signal transmission system according to the second embodiment.

In FIG. 14, numeral 301 denotes a time-base compression unit. This is identical to the time-base compression unit 101 employed in the first embodiment, and thus a description thereof will be omitted here.

Numeral 302 denotes a decomposition unit for decomposing a time-base-compressed audio signal to superimpose on signals in CTL1, CTL2, and CTL3 based on the DVI standard. The decompression unit 302 includes a control signal superimposing means for superimposing the control signal on the audio signal.

Figure 18:
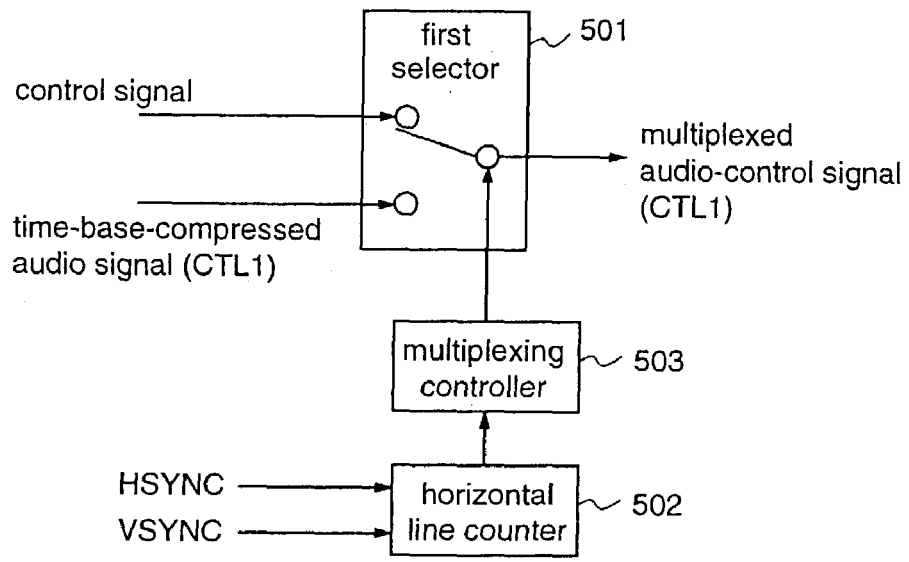
FIG. 18 is a diagram illustrating multiplexing of an audio signal and a control signal in the signal transmission system according to the second embodiment.

The control signal superimposing means will be described with reference to FIG. 18. In the drawing, numeral 501 denotes a first selector for selectively outputting the control signal and the time-base-compressed audio signal. In this second embodiment, a time-base-compressed audio signal superimposed on the CTL1 will be described. Numeral 502 denotes a horizontal line counter for counting horizontal lines on a screen. Numeral 503 denotes a multiplexing controller for outputting a multiplex control signal for controlling the first selector 501 according to a signal supplied from the horizontal line counter 502. In the second embodiment, not only the time-base-compressed audio signal but also the control signal are multiplexed in the CTL1. The first horizontal line counter 502 counts the number of horizontal lines on the basis of a vertical sync signal and a horizontal sync signal, and the first selector 501 selectively outputs the control signal in the 1st line in the vertical synchronization period, and selectively outputs the [audio signal] time-base-compressed audio signal in the 2nd and subsequent lines in the vertical synchronization period. Thus, the control signal and the time-base-compressed audio signal are multiplexed in the CTL1. Further, since the control signal is superimposed on the 1st line of the CTL1, the 1st lines of the CTL2 and CTL3 may be set at "Reserved" so as to time the control signal to the audio signal which is also superimposed on the CTL1. While in the second embodiment the control signal multiplexing means is included in the decompression unit 302, it may be constructed independently from the decompression unit 302.

Numerals 303~305 denote TMDS encoders/serializers, and numerals 306~308 denote TMDS decoders/recovery units.

Numeral 309 denotes a composition unit for composing the audio signals from CTL1, CTL2, and CTL3. The composition unit 309 includes a control signal demultiplexing means for demultiplexing the multiplexed audio-control signal into the [control signal and the audio signal] control signal and the time-base-compressed audio signal.

Figure 19:
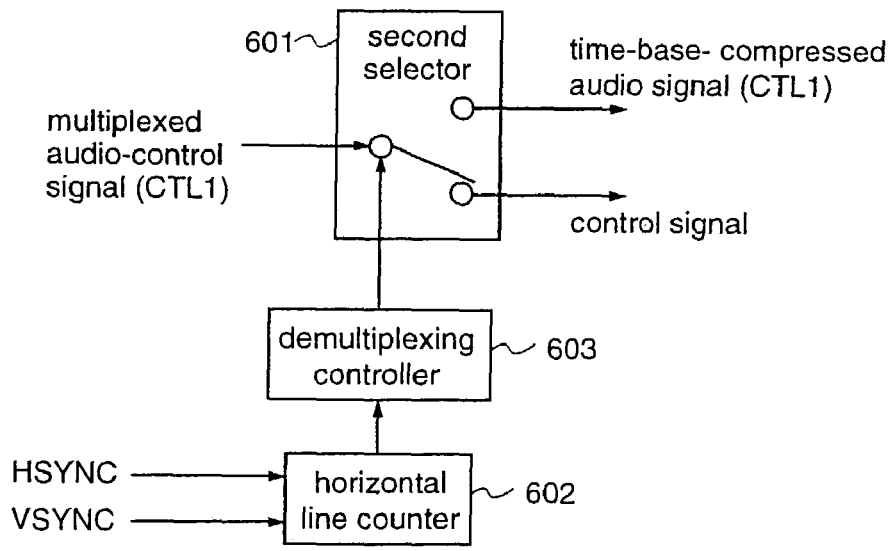
FIG. 19 is a diagram illustrating demultiplexing of a multiplexed audio-control signal in the signal transmission system according to the second embodiment.

The control signal demultiplexing means will be described with reference to FIG. 19. In the drawing, numeral 601 denotes a second selector for demultiplexing the [control signal and the audio signal] multiplexed audio-control signal into the control signal and the time-based-compressed audio signal. Numeral 602 denotes a horizontal line counter for counting the horizontal lines on the screen. Numeral 603 denotes a demultiplexing controller for outputting a demultiplexing control signal for controlling the second selector 601 according to a signal supplied from the horizontal line counter 602. While in the second embodiment the control signal demultiplexing means is included in the composition unit 309, it may be constructed independently from the composition unit 309. That is, the control signal demultiplexing means may receive the CTL1 which is outputted from the TMDS decoder/recovery unit 307, demultiplexe the CTL0 into the time-base-compressed audio signal (CTL1) and the control signal, and output the demultiplexed time-base-compressed audio signal to the composition unit 309.

Numeral 310 denotes a time-base decomposition unit for decomposing the time-base-compressed audio signal which is outputted from the composition unit 309.

In the drawing, a serial data in which a BLUE and a HSYNC and VSYNC of a video signal are time-division-multiplexed is transmitted through a channel 0 of a transmission path. A serial data in which a GREEN and a multiplexed audio-control signal (CTL1) are time-division-multiplexed is transmitted through a channel 1. A serial data in which a RED and multiplexed time-base-compressed signals (CTL2, CTL3) are time-division-multiplexed is transmitted through a channel 2.

Figure 15:
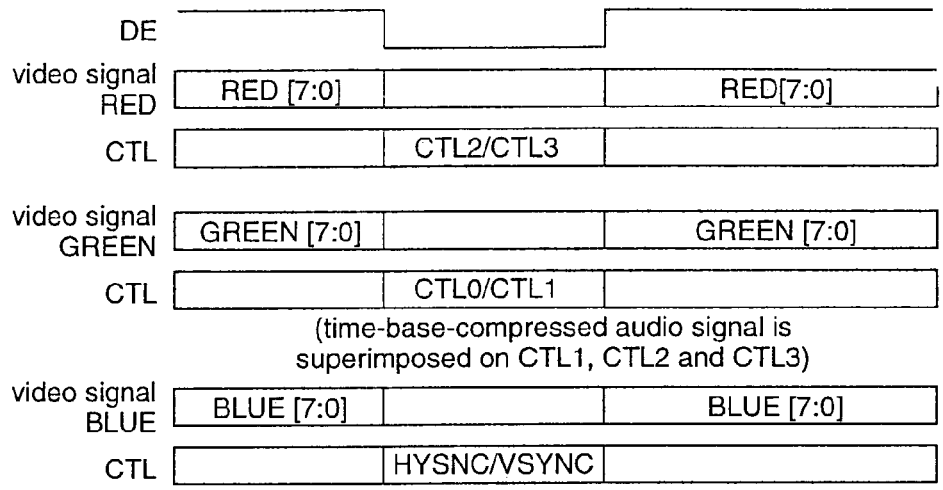
FIG. 15 is a diagram illustrating the states of respective signals in the signal transmission system according to the second embodiment.
Figure 15:
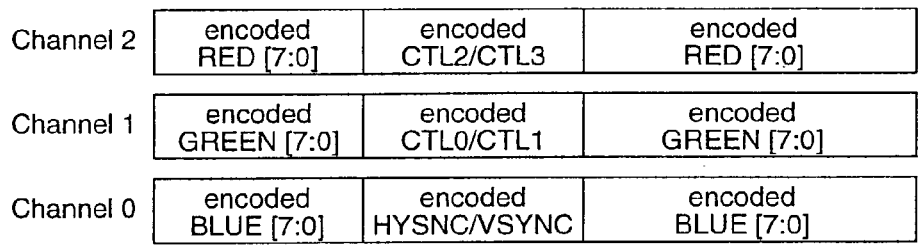
Figure 15:
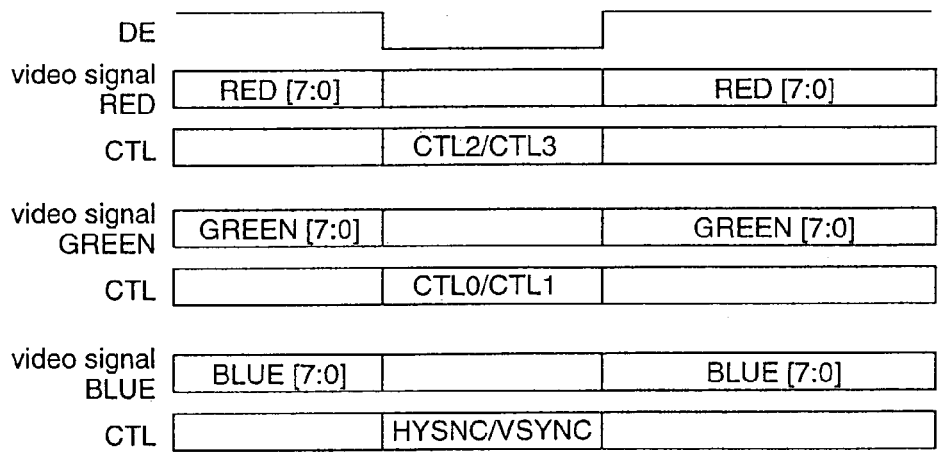

FIGS. 15 illustrate the states of signals on the transmission path according to the second embodiment. FIG. 15(*a*) shows data to be inputted to the TMDS encoders 303 305. The CLT is inserted while the DE (Date Enable) signal is LOW. That is, the time-base-compressed audio signal and the control signal are superimposed on the CTL1, and the time-base-compressed audio signal is superimposed on the CTL2 and CTL3, followed by TMDS encoding. FIG. 15(*b*) shows the signals on the transmission path. On the transmission path, the encoded CTL2 and CTL3 are superimposed on the channel 2, and the encoded CTL1 is superimposed on the channel 1. Thus, on the transmission path, the time-base-compressed audio signal is superimposed on the horizontal sync signal period, and the time-base-compressed audio signal and the control signal are superimposed on the period of vertical sync signal period. FIG. 15(*c*) shows data which have been TMDS-decoded and recovered by the TMDS decoders/recovery units 306 308 on the signal reception apparatus side. The recovered data is identical to the input data to the signal transmission apparatus.

The operation of the so-constructed signal transmission system will be described.

Figure 16:
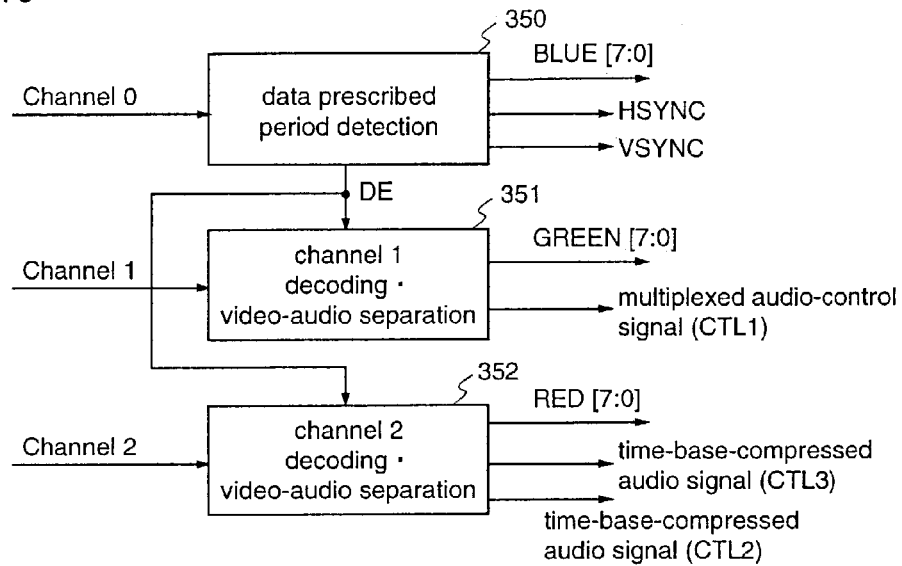
FIG. 16 is a diagram illustrating demultiplexing of a video signal, an audio signal, and a control signal in the signal transmission system according to the second embodiment.

A method of demultiplexing audio in the signal reception apparatus will be described with reference to FIG. 16.

Initially, a channel 0 decoder 350 decodes a signal on channel 0 to generate a BLUE signal, a DE signal, a horizontal synchronization period (HSYNC), and a vertical synchronization period (VSYNC). A period during which the DE signal is LOW is regarded as a period where the time-base-compressed audio signal and the control signal are multiplexed. The DE signal is supplied to a channel 1 decoder 351 and to a channel 2 decoder 352, and the video signal and the multiplexed audio-control signal are separated. In this way, the multiplexed audio-control signal appears in the CTL1, and the separated time-base-compressed audio signal appears in the lines CTL2 and CTL3.

Next, a method of decoding in the signal reception apparatus will be described with reference to FIG. 17.

Figure 17:
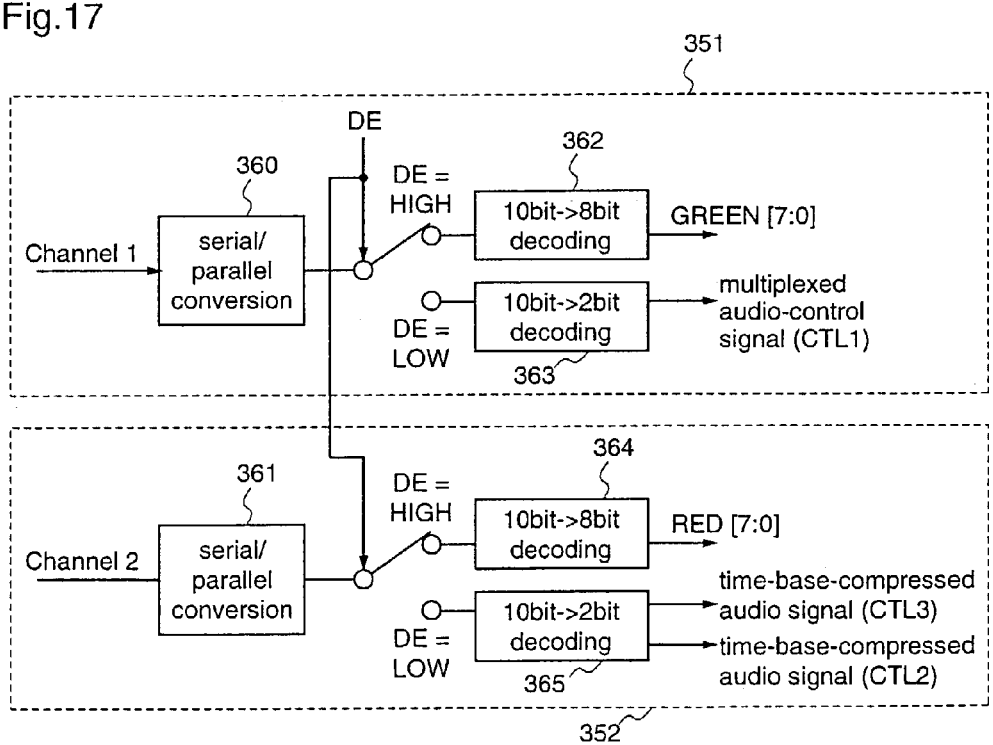
FIG. 17 is a diagram illustrating demultiplexing of a video signal and an audio signal in the signal transmission system according to the second embodiment.

In FIG. 17, a serial/parallel conversion circuit 361 performs serial/parallel conversion on the signal which is transmitted through the channel 2. While the DE signal is HIGH, the signal on the channel 2 is regarded as a video signal, and a decoder 364 performs 10-bits/8-bits TMDS decoding on the converted video signal, thereby obtaining the RED signal. On the other hand, while the DE signal is LOW, the signal on the channel 2 is a time-base-compressed audio signal, and a decoder 365 performs 10-bits/2-bits TMDS decoding on the converted audio signal, thereby obtaining the time-base-compressed audio signal in the lines CTL2 and CTL3.

Likewise, the signal which is transmitted through the channel 1 is also subjected to serial/parallel conversion by a serial/parallel conversion circuit 360. While the DE signal is HIGH, the signal on the channel 1 is regarded as a GREEN video signal, and a decoder 362 performs 10-bits/8-bits TMDS decoding on the converted video signal. On the other hand, while the DE signal is LOW, a decoder 363 performs 10-bits/2-bits TMDS decoding on the converted signal, thereby obtaining the multiplexed audio-control signal in the CTL1. The multiplexed audio-control signal (CTL1) is demultiplexed into the time-base-compressed audio signal (CTL1) and the control signal by the control signal demultiplexing means shown in FIG. 19.

In this way, the time-base-compressed audio signals obtained on the CTL lines are composed by the composition unit 309, and the rate of the composite time-base-compressed audio signal is converted by the time-base decompression unit 310, thereby obtaining the original audio signal.

Next, a description will be given of a method of demultiplexing and extracting the control signal and the time-base-compressed audio signal which are multiplexed on the CTL1, with reference to FIG. 19. FIG. 19 is a diagram illustrating the construction of the control signal demultiplexing means for demultiplexing the superimposed control signal from the multiplexed audio-control signal.

The horizontal line counter 602 counts horizontal lines on a screen. The horizontal lines are counted by counting falling of a horizontal sync signal with falling of a vertical sync signal being a standard, employing the horizontal sync signal (HSYNC) and the vertical sync signal (VSYNC) which are generated by the channel 0 decoder 350.

When the output of the horizontal line counter 602 indicates the 1st line, the signal on the CTL1 is regarded as a control signal, and the second selector 601 is switched by the demultiplexing controller 603 to extract the control signal from the multiplexed audio-control signal. When the output of the horizontal line counter 602 is any of the 2nd and subsequent lines in the vertical synchronization period, the signal on the CTL1 is regarded as a time-base-compressed audio signal, and the second selector 601 is switched by the demultiplexing controller 603 to extract the time-base-compressed audio signal from the multiplexed audio-control signal. In this way, the multiplexed audio-control signal is demultiplexed into the control signal and the time-base-compressed audio signal.

While the decomposition unit 302 decomposes the time-base-compressed audio signal into the three lines CTL1, CTL2, and CTL3, only one line CTL1 or two lines CTL2 and CTL3 may be used according to a band of the audio signal. Further, the time-base-compressed audio signal is decomposed into the lines in the order of CTL1, CTL2, CTL3, CTL1, CTL2, CTL3, . . . according to the order of the sampling points of the audio signal.

The composition unit 309 regards that the decoded audio signals transmitted through the transmission path are in the order of CTL1, CTL2, CTL3, and performs composition of the audio signals. Although the order of the audio signals is not restricted to that mentioned above and the three lines CTL1, CTL2, and CTL3 may be used in an arbitrary order, the order of decomposition and composition must be predetermined by the signal transmission apparatus and the signal reception apparatus.

As described above, in the signal transmission system according to the second embodiment, the construction of the signal transmission system according to the first embodiment is applied to the DVI standard. The time-base-compressed audio signal is demultiplexed to be superimposed on the lines CTL1, CTL2, and CTL3, and the control signal is superimposed on a horizontal line of different CTL so that it can be discriminated from the audio signal. In the signal reception apparatus, the time-base-compressed audio signals transmitted through the CTL1, the CTL2, and the CTL3 are composed, and time-base decompressed, thereby reconstructing the audio signal. Further, the audio signal and the control signal are discriminated from each other from the CTL1 in which the time-base-compressed audio signal and the control signal are multiplexed, by a horizontal line, and the audio signal and the control signal are demultiplexed and extracted. Therefore, the audio signal and the control signal can be also transmitted in the signal transmission system based on the DVI standard by which only the video signal has conventionally been transmitted.

While in this second embodiment the control signal is superimposed on the CTL1, the control signal may be superimposed on another CTL signal, such as DVI-based CTL2 or CTL3 by a method similar to that mentioned above, or the control signal may be superimposed on plural CTL signals selected from those mentioned above.

Further, while in the first and second embodiments the control signal is superimposed on the 1st line of the CTL1, the control signal may be superimposed on any line as long as the line is in the vertical synchronization period, or the control signal may be superimposed on plural lines of the CTL1.

Figure 12:
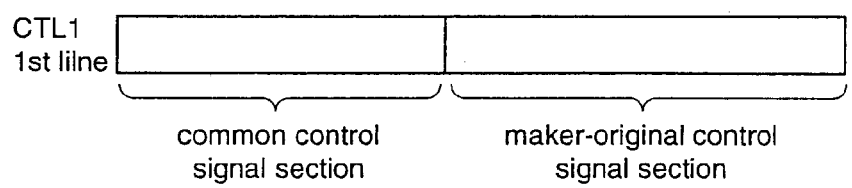
FIG. 12 is a diagram showing an example of a control signal.

In the so-constructed system, the control signal in the 1st line of the CTL1 is further divided into, for example, a section of a control signal prescribed by manufacturers, and a section of a manufacturer original control signal, as shown in FIG. 12, and the so-divided control signal is transmitted. The section of the control signal prescribed by the manufacturers is used for controlling a display, employing a format or standard prescribed by plural manufacturers. For example, the signal transmission apparatus can transmit signals not only to the signal reception apparatus, and a screen is displayed in the signal reception apparatus. The section of the manufacturer-original control signal is used to specify, for example, a product number of the signal reception apparatus or the like when control is performed by a manufacturer-original format. Accordingly, for example a display with high picture quality can be realized when the same manufacturer's apparatuses are connected. At this time, a manufacturer code and a model code are separately transmitted through an IIC which is based on the DVI standard.

Figure 13:
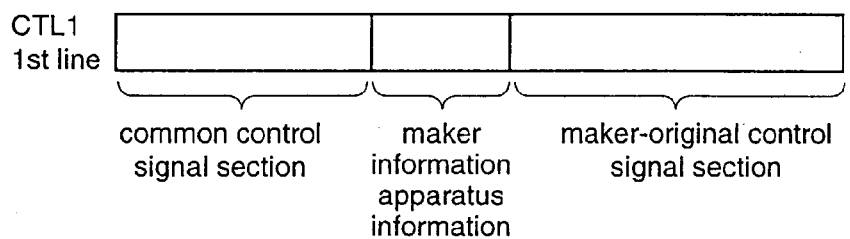
FIG. 13 is a diagram showing an example of a control signal.

Further, there is another method in which the 1st line of the CTL1 is further divided into, for example, a section of a control signal prescribed by manufacturers, a section of a manufacturer-original control signal, and a section indicating apparatus specifying information for specifying an apparatus, such as a manufacturer code, a mode code, and the like, as shown in FIG. 13, and the so-divided control signal is transmitted.

Furthermore, information on the connected apparatus which has received the signal may be OSD-displayed.

While in the second embodiment the description has been given of the case where the control signal is superimposed on the CTL on the basis of the DVI standard, the present invention is not restricted thereto, and it is also possible to use a control signal in transmission of a digital signal.

Embodiment 3

Hereinafter, a signal transmission system according to a third embodiment will be described. According to this third embodiment, in the signal transmission system described in the first embodiment, the signal transmission apparatus transmits a signal which has been transmitted at 24P of cinema or a signal imaged at 30P, to the signal reception apparatus. Generally, in a television video signal of cinema, video of the same frame (screen) is transmitted at a cycle of two times/three times. This is because the television video signal is operated at 60 Hz (locally 50 Hz) as compared with cinema being operated at 24 Hz (24-frame/second).

Figure 20:
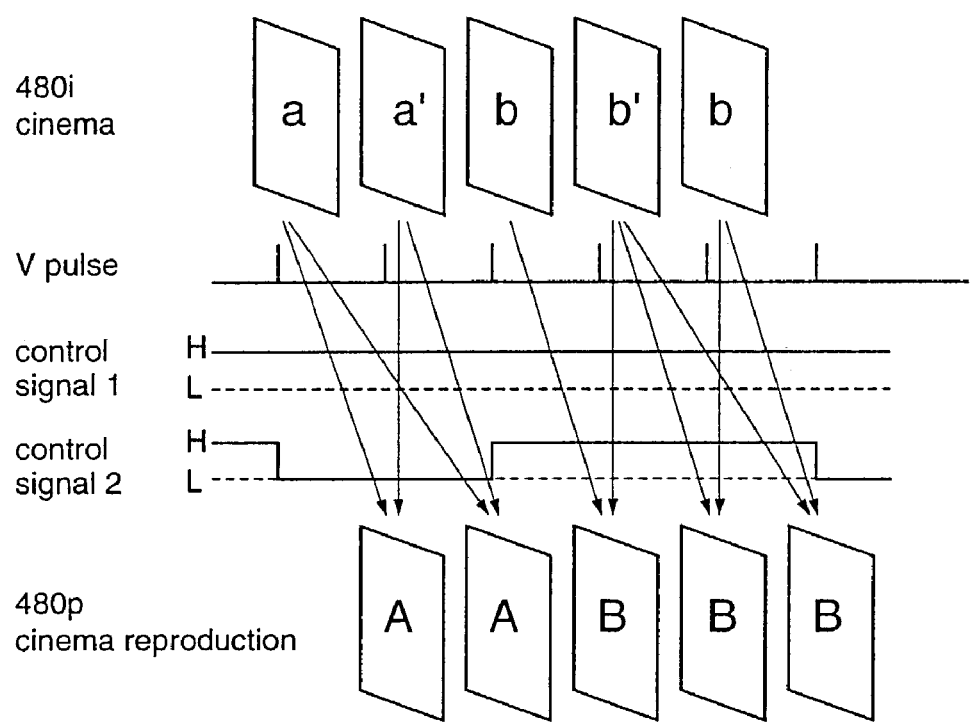
FIG. 20 is a diagram illustrating control of a 24P signal in a signal transmission system according to a third embodiment.

FIG. 20 shows an example of a television signal in which a picture of cinema is transmitted at 60 Hz at the cycle of two times/three times.

In FIG. 20, a control signal 1 and a control signal 2 are outputted from an MPEG decoder, and superimposed on a blanking period together with an audio signal, and the superimposed signal is digitally transmitted. The control signal 1 indicates whether a field is repeated or not. Here, the filed is repeated when the control signal 1 is HIGH (H). The control signal 2 indicates a period during which the field is repeated for the same picture. Further, "a, a'" indicates that the field is repeated twice, and "b, b', b"" indicates that the field is repeated three times. These control signals 1 and 2 are transmitted from a signal source such as a STB or a DVD through a high-speed digital interface. Since 480i is an interlace signal, it is different according to the field (for example, "a" and "a'"). However, since this signal is originally a signal of the same picture "A", the control signal 1 indicates "H", and the control signal 2 indicates "L" for the two fields a, a', while indicates "H" for the three fields b, b', b. A display device for progressively displaying this control signal 2 is able to reproduce "A" and "B" with high picture quality when there are respective pieces of field information. While in a usual IP conversion, a movement is detected and an interpolation processing is adaptively performed, the full progressive picture can be reproduced in this case. Thus, in the signal transmission system described in the first embodiment, the signal which has been transmitted at 24P of cinema or the signal imaged at 30P can be progressively converted with high picture quality on the receiver side, by making the control signal 1 at a special sequence of 24P or 30P HIGH, and transmitting the sequence by the control signal 2, as shown in FIG. 20.

As described above, in the signal transmission system according to the third embodiment, the audio signal and the control signal which includes information for discriminating the [sequence of cinema] field repeat sequence of cinema are multiplexed on the video signal, and the multiplexed signal is transmitted. Therefore, the 24P signal or 30P signal of cinema mode can be displayed on a monitor with high picture quality. Further, in the signal transmission system according to the third embodiment, when a signal of 25P or the like is included at the time of 50Hz, or when the signal is at a mode of 24P or 30P, this is directly displayed on an OSD, or a signal imposing a change, such as color change in usual display, is included.

Embodiment 4

Hereinafter, a signal transmission system according to a fourth embodiment will be described.

Figure 21:
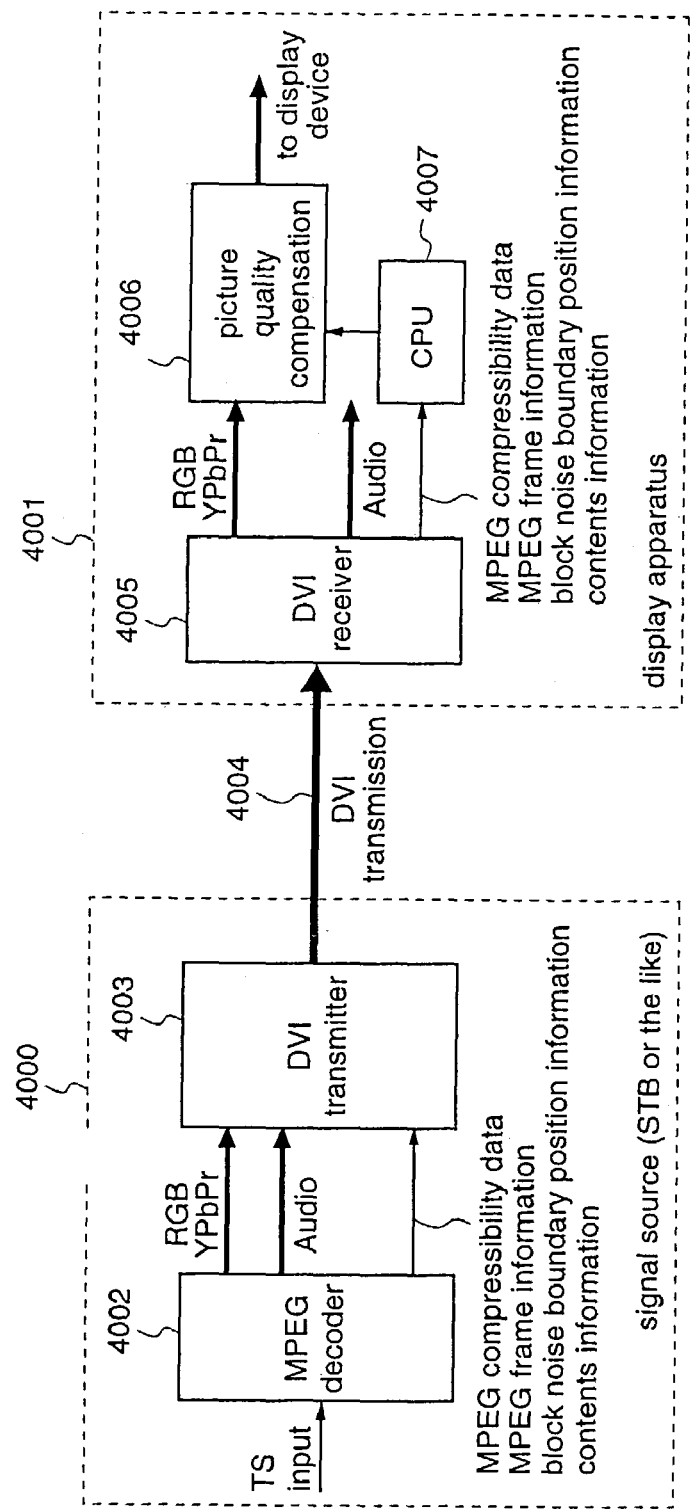
FIG. 21 is a diagram illustrating the construction of a signal transmission system according to a fourth embodiment.

FIG. 21 is a diagram illustrating the construction of the signal transmission system according to the fourth embodiment. As shown in the drawing, when a signal which is compressed by an MPEG or the like is inputted, information on the compressed signal, such as compressibility information, MPEG frame information (I/P/B), information of a boundary position of block noise, and contents type information indicating whether video is a data broadcasting (character) or a motion picture, is transmitted as a control signal.

In FIG. 21, numeral 4000 denotes a video signal source such as a STB, numeral 4001 denotes a CTR or a display apparatus such as a liquid crystal or plasma, numeral 4002 denotes an MPEG decoder, numeral 4003 denotes a DVI transmitter, numeral 4004 denotes a cable of DVI system, numeral 4005 denotes a DVI receiver, numeral 4006 denotes a picture quality compensator of configuration of dedicated LSI or DSP, and numeral 4007 denotes a CPU.

Figure 23:
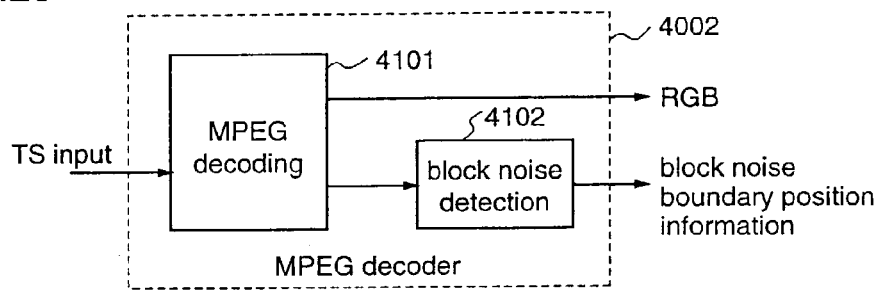
FIG. 23 is a diagram illustrating the construction of an MPEG decoder in the signal transmission system according to the fourth embodiment.

FIG. 23 is a diagram illustrating the construction of the PMEG decoder 4002.

In FIG. 23, an MPEG decoding means 4101 decodes an input stream. A block noise detection means 4102 detects a block where block-shaped noise is generated, for each screen, and outputs a boundary position of the detected block as block noise boundary position information. The detection of block noise may be performed for each screen, or may be also performed for a specific domain or a specific screen restrictedly. Further, position information of only a predetermined block may be outputted as block noise boundary position information.

Figure 24:
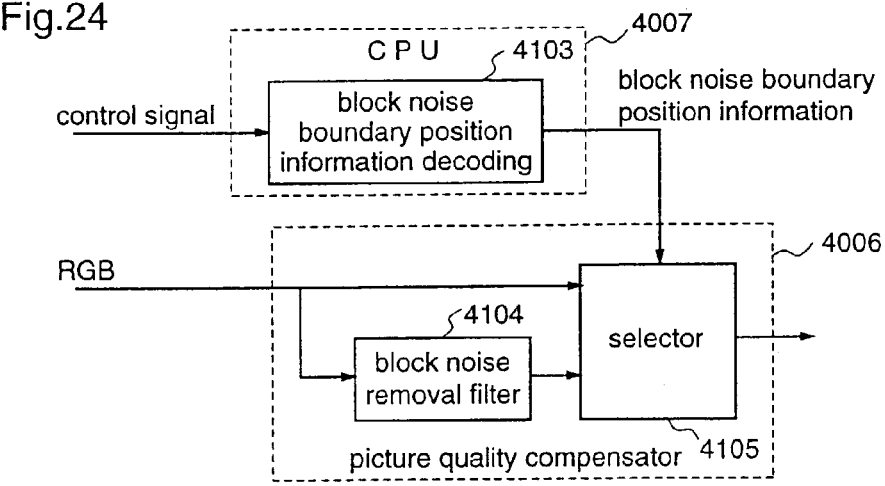
FIG. 24 is a diagram illustrating the constructions of a CPU and a picture quality compensator in the signal transmission system according to the fourth embodiment.
Figure 25:
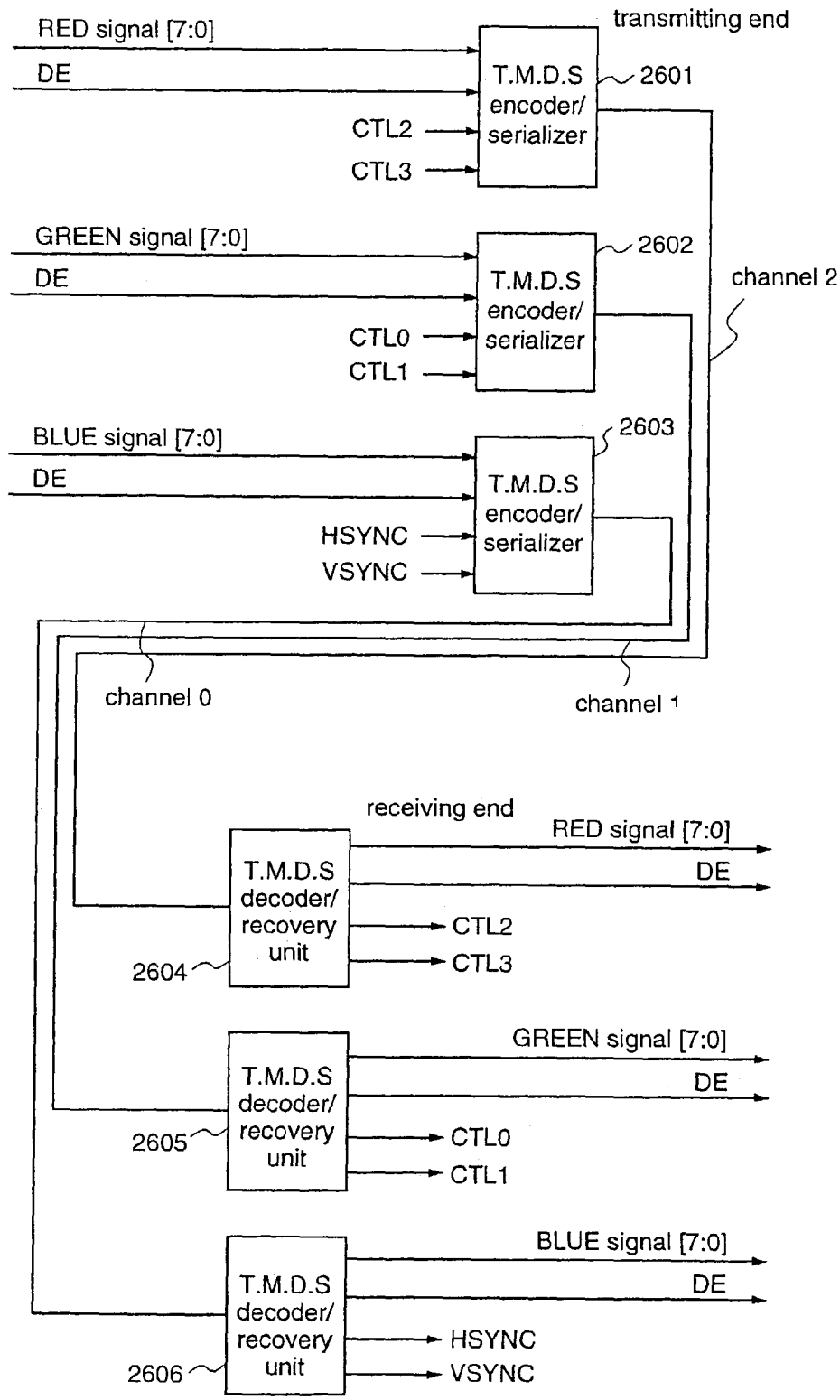
FIG. 25 is a diagram illustrating the construction of a conventional signal transmission system.

FIG. 24 is a diagram illustrating the constructions of the picture quality compensator 4006 and the CPU 4007 in the display apparatus 4001.

In FIG. 24, the CPU 4007 has a block noise boundary position information decoding means 4103 for decoding the block noise boundary position information included in the inputted control signal and outputting the decoded block noise boundary position information to the picture quality compensator 4006. The picture quality compensator 4006 has a block noise removal filter 4104 for removing noise of the inputted RGB signal, and a selector 4105 for selecting either the RGB signal or the output signal from the block noise removal filter 4104 on the basis of the block noise position information.

The operation of the so-constructed signal transmission system will be described.

On the video signal source 4000 side, a transport stream (TS) is inputted to the MPEG decoder 4002. In the MPEG decoder 4002, the inputted transport stream (TS) is decoded by the MPEG decoding means 4101, and the decoded transport stream (TS) is outputted to the block noise detection means 4102 and the DVI transmitter 4003. The block noise detection means 4102 detects a block where block-shaped noise is generated, for each screen, and outputs a boundary position of the detected block to the DVI transmitter 4003 as block noise boundary position information. The detection of block noise may be performed for each screen, or may be also performed for a specific domain or a specific screen restrictedly. Further, position information of only a predetermined block may be outputted as block noise boundary position information.

A video signal, an audio signal, and a control signal which are decoded by the MPEG decoder 4002 are multiplexed by the DVI transmitter 4003, and the multiplexed signal is inputted to the display apparatus 4001 through the DVI-system cable 4004.

On the display apparatus 4001 side, the video signal and the control signal including the block noise boundary position information are outputted from the DVI receiver 4005. The control signal outputted from the DVI receiver 4005 is inputted to the CPU 4007 to be decoded, and the block noise boundary position information is outputted to the picture quality compensator 4006. In the picture quality compensator 4006, a signal obtained by the block noise removal filter 4104 performing noise removal processing on the RGB signal which is transmitted from the DVI receiver 4005, and the RGB signal are inputted to the selector 4105. The selector 4105 selects, for example, the output signal from the block noise filter 4104 in the case where a signal corresponding to the block noise position information is inputted, and selects the RGB signal in cases other than described above, on the basis of the block noise position information transmitted from the CPU 4007, and the selected signal is outputted to a display device.

Figure 22:
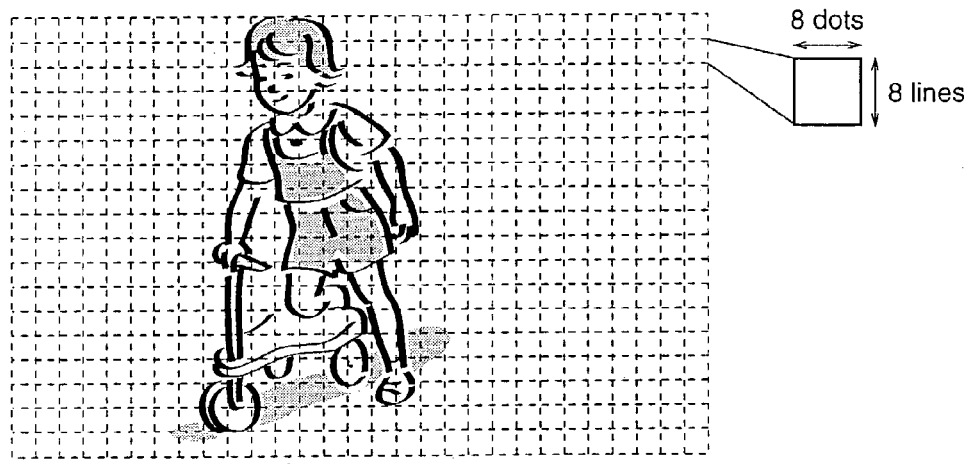
FIG. 22 is a diagram showing an example of a block noise.

An example of block noise will be described with reference to FIG. 22.

Since a signal compressed by the MPEG has been subjected to DCT processing for every 8-dot×8-line when being encoded, and signal information has been gathered for compression, there is seen grid-shaped noise for every 8×8. In this way, when the exact position of the block-shaped noise is fixedly recognized, it is possible to perform filtering for that pixel. In this system for transmitting a baseband signal of a digital signal, the block boundary information is transmitted as the control signal, so that the block noise removal filter 4104 can adaptively perform filtering according to the block noise boundary position information, thereby removing block noise.

While in the fourth embodiment the control signal includes the block noise boundary position information, the control signal may include [compressibility data] MPEG compressibility data, MPEG frame information, or contents type information. In this case, the outputted control signal including the [compressibility data/frame information] MPEG compressibility data/MPEG frame information/contents type information is inputted to the CPU 4007, and the picture quality compensator 4006 is controlled according to the MPEG compressibility data/MPEG frame information/contents type information. Further, the MPEG compressibility data/MPEG frame information/block noise boundary position information/contents type information, which is outputted from the DVI receiver 4005 may be directly inputted to the picture quality compensator 4006, instead of the CPU 4007, so that picture quality compensation is performed therein. Furthermore, the compressibility information may be displayed on a screen as OSD by employing the compressibility data outputted from the DVI receiver 4005.

As described above, in the signal transmission system according to the fourth embodiment, the control signal including the MPEG compressibility of vieo, the MPEG frame information (I/P/B), the block noise boundary position information or the like is transmitted, thereby performing picture quality compensation most appropriate for MPEG noise or output contents, according to the characteristics of a device (such as a CRT/LCD/PDP), at the receiving end. Therefore, a signal transmission system which provides a viewer with high quality video can be realized.

APPLICABILITY IN INDUSTRY

A signal transmission apparatus and a signal reception apparatus according to the present invention are available as a signal transmission system for transmitting a multiplexed video-audio-control signal and, particularly, suited for a signal transmission system for transmitting/receiving secret information, in which copy protection information or the like is superimposed as a control signal to restrict contents display.

We claim:

1. A signal transmission apparatus comprising:
a time-base compression unit for compressing an audio signal on the time axis to output a time-base-compressed audio signal; and
a multiplexing unit for multiplexing a video signal, a control signal which includes information related to the control of a monitor, and the time-base-compressed audio signal to output a multiplexed video-audio-control signal to the outside.

2. The signal transmission apparatus as defined in claim 1, wherein the multiplexing unit comprises:
a horizontal line counter for counting the number of horizontal lines on a screen;
a first selector for selecting either the control signal or the time-base-compressed audio signal to output;
a first multiplexing controller for controlling the first selector;
a second selector for selecting either the output signal from the first selector or the video signal to output; and
a second multiplexing controller for controlling the second selector.

3. The signal transmission apparatus as defined in claim 2, wherein the multiplexing unit is operable to select the control signal to be output by the first selector during a first line of the vertical synchronization period.

4. The signal transmission apparatus as defined in claim 1, wherein the control signal is constituted by a section in which the contents of the control signal are prescribed by manufacturers, and a section of a manufacturer-original control signal.

5. The signal transmission apparatus as defined in claim 1, wherein the control signal is constituted by a section in which the contents of the control signal are prescribed by manufacturers, an apparatus discrimination control section for discriminating an apparatus, and a section of a manufacturer-original control signal.

6. The signal transmission apparatus as defined in claim 1, wherein the control signal includes information for discriminating a sequence of cinema.

7. The signal transmission apparatus as defined in claim 1, wherein the control signal includes information indicating compressibility of video.

8. The signal transmission apparatus as defined in claim 1, wherein the control signal includes frame information of video.

9. The signal transmission apparatus as defined in claim 1, wherein the control signal includes information for discriminating whether video is on a data broadcasting screen or on a usual motion picture screen.

10. The signal transmission apparatus as defined in claim 1, wherein the control signal includes information indicating the position of block noise of video.

11. A signal reception apparatus for receiving a video-audio-control signal in which a video signal, a time-base-compressed audio signal, and a control signal are multiplexed, comprising:
a demultiplexing unit for demultiplexing the video-audio-control signal into the video signal, the time-base-compressed audio signal, and the control signal the control signal includes information related to the control of a monitor;
a time-base decompression unit for performing time-base decompression on the time-base-compressed audio signal to reconstruct an original audio signal; and
an audio clock reproduction unit for receiving a video clock signal from a signal transmission apparatus, and reproducing an audio clock on the basis of the video clock signal to output to the time-base decompression unit.

12. The signal reception apparatus as defined in claim 11, wherein the demultiplexing unit comprises:
a horizontal line counter for counting the number of horizontal lines on a screen;
a first selector for demultiplexing the multiplexed video-audio-control signal into the video signal and the multiplexed audio-control signal;
a first demultiplexing controller for controlling the first selector;
a second selector for demultiplexing the multiplexed audio-control signal into the control signal and the time-base-compressed audio signal; and
a second demultiplexing controller for controlling the second selector.

13. The signal reception apparatus as defined in claim 11, wherein the control signal is constituted by a section in which the contents of the control signal are prescribed by manufacturers, and a section of a manufacturer-original control signal.

14. The signal reception apparatus as defined in claim 11, wherein the control signal is constituted by a section in which the contents of the control signal are prescribed by manufacturers, an apparatus discrimination control section for discriminating an apparatus, and a section of a manufacturer-original control signal.

15. The signal reception apparatus as defined in claim 11, wherein the control signal includes information for discriminating a sequence of cinema.

16. The signal reception apparatus as defined in claim 11, wherein the control signal includes information indicating compressibility of video.

17. The signal reception apparatus as defined in claim 11, wherein the control signal includes frame information of video.

18. The signal reception apparatus as defined in claim 11, wherein the control signal includes information for discriminating whether video is on a data broadcasting screen or on a usual motion picture screen.

19. The signal reception apparatus as defined in claim 11, wherein the control signal includes information indicating the position of block noise of video.

20. A signal transmission apparatus comprising:
   a time-base compression unit operable to compress an audio signal on the time axis to output a time-base-compressed audio signal; and
   a multiplexing unit operable to multiplex a video signal, a control signal which includes information related to the control of a monitor, and the time-base compressed audio signal to output a multiplexed video-audio-control signal to the outside;
said multiplexing unit comprises:
   a horizontal line counter operable to count the number of horizontal lines on a screen based on a vertical sync signal and a horizontal sync signal;
   a first selector operable to select either the control signal or the time-base-compressed audio signal to output;
   a first multiplexing controller operable to control the first selector;
   a second selector operable to select either the output signal from the first selector or the video signal to output; and
   a second multiplexing controller operable to control the second selector;
   wherein the first selector selects the control signal to be output in the first line in a vertical synchronization period and selects the time-compressed audio signal to be output in the second and subsequent lines in the vertical synchronization period.

* * * * *

UNITED STATES PATENT AND TRADEMARK OFFICE
CERTIFICATE OF CORRECTION

PATENT NO. : 7,339,959 B2  
APPLICATION NO. : 10/149309  
DATED : March 4, 2008  
INVENTOR(S) : Yutaka Nio et al.

Page 1 of 1

It is certified that error appears in the above-identified patent and that said Letters Patent is hereby corrected as shown below:

Col. 2, Line 42: Please delete the words "second selector. second selector."
and replace with --second selector.--

Col. 5, Lines 22-23: Please delete the words "the control signal includes information indicating compressibility of video" and replace with --the control signal includes frame information of video--

Signed and Sealed this

Seventeenth Day of June, 2008

JON W. DUDAS  
*Director of the United States Patent and Trademark Office*